United States Patent
Ismael

(10) Patent No.: US 10,474,813 B1
(45) Date of Patent: Nov. 12, 2019

(54) CODE INJECTION TECHNIQUE FOR REMEDIATION AT AN ENDPOINT OF A NETWORK

(71) Applicant: FireEye, Inc., Milpitas, CA (US)

(72) Inventor: Osman Abdoul Ismael, Palo Alto, CA (US)

(73) Assignee: FireEye, Inc., Milpitas, CA (US)

(*) Notice: Subject to any disclaimer, the term of this patent is extended or adjusted under 35 U.S.C. 154(b) by 170 days.

(21) Appl. No.: 14/921,672

(22) Filed: Oct. 23, 2015

Related U.S. Application Data

(60) Provisional application No. 62/141,099, filed on Mar. 31, 2015.

(51) Int. Cl.
| | | |
|---|---|---|
| G06F 21/54 | (2013.01) | |
| G06F 21/53 | (2013.01) | |
| G06F 21/56 | (2013.01) | |
| H04L 29/06 | (2006.01) | |

(52) U.S. Cl.
CPC .............. *G06F 21/53* (2013.01); *G06F 21/54* (2013.01); *G06F 21/566* (2013.01); *H04L 63/145* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,319,776 A | 6/1994 | Hile et al. | |
| 5,440,723 A | 8/1995 | Arnold et al. | |
| 5,490,249 A | 2/1996 | Miller | |
| 5,657,473 A | 8/1997 | Killean et al. | |
| 5,802,277 A | 9/1998 | Cowlard | |
| 5,842,002 A | 11/1998 | Schnurer et al. | |
| 5,960,170 A | 9/1999 | Chen et al. | |
| 5,978,917 A | 11/1999 | Chi | |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Amiri Sani, Ardalan, et al. "I/O paravirtualization at the device file boundary," *ACM SIGPLAN Notices* 49.4 (2014), pp. 319-332.

(Continued)

*Primary Examiner* — Trang T Doan
(74) *Attorney, Agent, or Firm* — Rutan & Tucker, LLP

(57) ABSTRACT

A technique injects code into a suspicious process containing malware executing on a node to enable remediation at the node. Illustratively, the technique may inject code into the suspicious process during instrumentation of the malware in a micro-virtual machine (VM) to monitor malicious behavior and to enable remediation of that behavior at a node embodied as an endpoint. According to the technique, code may be injected into the suspicious process during instrumentation in the micro-VM of the endpoint to restore states of kernel resources (e.g., memory) that may be infected (i.e., altered) by behavior (actions) of the malware.

32 Claims, 6 Drawing Sheets

(56) References Cited

U.S. PATENT DOCUMENTS

| | | |
|---|---|---|
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,317 B1 * | 7/2012 | Chiueh .............. G06F 9/455 713/164 |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,239,947 B1 * | 8/2012 | Glick .............. G06F 21/52 713/1 |
| 8,260,914 B1 | 9/2012 | Ranjan |
| 8,266,091 B1 | 9/2012 | Gubin et al. |
| 8,271,978 B2 | 9/2012 | Bennett et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,369 B2 | 2/2013 | Mensch et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,286 B2 | 7/2013 | Dalcher et al. |
| 8,479,291 B1 | 7/2013 | Bodke |
| 8,479,292 B1 | 7/2013 | Li et al. |
| 8,510,827 B1 | 8/2013 | Leake et al. |

(56) References Cited

U.S. PATENT DOCUMENTS

| | | |
|---|---|---|
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,612,995 B1 | 12/2013 | Yun |
| 8,627,476 B1 | 1/2014 | Satish et al. |
| 8,635,696 B1 | 1/2014 | Aziz |
| 8,682,054 B2 | 3/2014 | Kue et al. |
| 8,682,812 B1 | 3/2014 | Ranjan |
| 8,689,333 B2 | 4/2014 | Aziz |
| 8,695,060 B2 | 4/2014 | Wade et al. |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,775,715 B2 | 7/2014 | Tsirkin et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,352 B2 | 9/2014 | Tsirkin et al. |
| 8,832,829 B2 | 9/2014 | Manni et al. |
| 8,839,245 B1 | 9/2014 | Khajuria et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,910,155 B1 * | 12/2014 | Sobel .............. G06F 9/445 718/1 |
| 8,935,779 B2 | 1/2015 | Manni et al. |
| 8,949,257 B2 | 2/2015 | Shifter et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,962 B1 * | 12/2015 | Kashyap .............. G06F 21/566 |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,411,979 B2 * | 8/2016 | Agarwal .............. G06F 9/44505 |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,489,516 B1 * | 11/2016 | Lu .............. G06F 21/566 |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shifter et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |

(56) References Cited

U.S. PATENT DOCUMENTS

| | | |
|---|---|---|
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0120856 A1 | 6/2003 | Neiger et al. |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0216759 A1 | 9/2005 | Rothman et al. |
| 2005/0229250 A1* | 10/2005 | Ring ................ G06F 21/57 726/23 |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0130060 A1 | 6/2006 | Anderson et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |

(56) References Cited

U.S. PATENT DOCUMENTS

| | | |
|---|---|---|
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028124 A1 | 1/2008 | Tago |
| 2008/0028463 A1 | 1/2008 | Dagon |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184016 A1* | 7/2008 | Erlingsson ........... G06F 12/1441 712/233 |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0244206 A1 | 10/2008 | Heo et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0023810 A1 | 1/2010 | Stolfo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0107245 A1* | 4/2010 | Jakubowski ........... G06F 21/52 726/22 |
| 2010/0107252 A1* | 4/2010 | Mertoguno ........... G06F 21/55 726/23 |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0004935 A1 | 1/2011 | Moffie et al. |
| 2011/0025504 A1 | 2/2011 | Lyon et al. |
| 2011/0041179 A1 | 2/2011 | St Hlberg |
| 2011/0047542 A1 | 2/2011 | Dang et al. |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0153909 A1 | 6/2011 | Dong |
| 2011/0167493 A1 | 7/2011 | Song et al. |
| 2011/0167494 A1 | 7/2011 | Bowen et al. |
| 2011/0173213 A1 | 7/2011 | Frazier et al. |

(56) References Cited

U.S. PATENT DOCUMENTS

| | | |
|---|---|---|
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0296412 A1 | 12/2011 | Banga et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0047580 A1 | 2/2012 | Smith et al. |
| 2012/0054869 A1 | 3/2012 | Yen et al. |
| 2012/0066698 A1 | 3/2012 | Yanoo |
| 2012/0079594 A1* | 3/2012 | Jeong .............. G06F 21/57 726/23 |
| 2012/0079596 A1* | 3/2012 | Thomas ............ G06F 21/55 726/24 |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0233612 A1 | 9/2012 | Beckett |
| 2012/0254995 A1 | 10/2012 | Sallam |
| 2012/0255002 A1 | 10/2012 | Sallam |
| 2012/0255015 A1 | 10/2012 | Sahita et al. |
| 2012/0255016 A1 | 10/2012 | Sallam |
| 2012/0255017 A1 | 10/2012 | Sallam |
| 2012/0255021 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0311708 A1 | 12/2012 | Agarwal et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0031374 A1 | 1/2013 | Thom et al. |
| 2013/0036472 A1 | 2/2013 | Aziz |
| 2013/0047257 A1 | 2/2013 | Aziz |
| 2013/0055256 A1 | 2/2013 | Banga et al. |
| 2013/0061012 A1 | 3/2013 | Turner et al. |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0145471 A1 | 6/2013 | Richard et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0191924 A1 | 6/2013 | Tedesco et al. |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0312099 A1* | 11/2013 | Edwards .............. G06F 21/554 726/24 |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0333033 A1 | 12/2013 | Khesin |
| 2013/0346966 A1 | 12/2013 | Natu et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1* | 7/2014 | Jung .............. G06F 9/45558 718/1 |
| 2014/0189866 A1 | 7/2014 | Shifter et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael |
| 2016/0006756 A1 | 1/2016 | Ismael |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0205115 A1* | 7/2016 | Kulkarni .............. G06F 21/568 726/1 |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | WO2012/135192 | 10/2012 |

(56) References Cited

FOREIGN PATENT DOCUMENTS

| WO | WO2012/154664 | | 11/2012 |
|---|---|---|---|
| WO | WO-2012/177464 | A1 | 12/2012 |
| WO | 2013/067505 | A1 | 5/2013 |
| WO | WO-2014/004747 | A2 | 1/2014 |
| WO | WO-2013/091221 | A1 | 6/2015 |

OTHER PUBLICATIONS

"Bromium vSentry—Defeat the Unknown Attack," Oct. 10, 2013, 11 pages.
Bromium Corp, "Live Attack Visualization and Analysis, What does a Malware attack look like?" http://www.bromium.com/sites/default/files/Bromium%20LAVA%20WP_2.pdf on Dec 1, 2013, 11 pages.
Chen, Peter M., and Brian D. Noble. "When virtual is better than real [operating system relocation to virtual machines]." Hot Topics in Operating Systems, 2001. Proceedings of the Eighth Workshop on. IEEE, 2001.
Gao, Debin, Michael K. Reiter, and Dawn Xiaodong Song. "On Gray-Box Program Tracking for Anomaly Detection." USENIX security symposium. 2004.
Garfinkel, Tal, and Mendel Rosenblum. "A Virtual Machine Introspection Based Architecture for Intrusion Detection." NDSS. 2003.
Heiser, Gernot, and Ben Leslie. "The OKL4 Microvisor: Convergence point of microkernels and hypervisors." Proceedings of the first ACM asia-pacific workshop on Workshop on systems. ACM, 2010.
Hofmeyr, Steven A., Stephanie Forrest, and Anil Somayaji. "Intrusion detection using sequences of system calls." Journal of computer security 6.3 (1998): 151-180.
Huang, Yih, et al. "Efficiently tracking application interactions using lightweight virtualization." Proceedings of the 1st ACM workshop on Virtual machine security. ACM, 2008.
Iqbal; Asif, Nayeema Sadeque, and Rafika Ida Mutia. "An overview of microkernel; hypervisor and microvisor virtualization approaches for embedded systems." *Report, Department of Electrical and Information Technology, Lund University, Sweden* 2110 (2009), 15 Pages.
Iqbal, et al.,—"An Overview of Microkernel, Hypervisor and Microvisor Virtualization Approaches for Embedded Systems," Department of Electrical and Information Technology, Lund University, Sweden, Aug. 26, 2013, 15 pages.
Jiang, Xuxian, Xinyuan Wang, and Dongyan Xu. "Stealthy malware detection through vmm-based out-of-the-box semantic view reconstruction." Proceedings of the 14th ACM conference on Computer and communications security. ACM, 2007.
Jones, Stephen T., Andrea C. Arpaci-Dusseau, and Remzi H. Arpaci-Dusseau. "Antfarm: Tracking Processes in a Virtual Machine Environment." USENIX Annual Technical Conference, General Track. 2006.
Kapravelos, Alexandros, et al. "Revolver: An Automated Approach to the Detection of Evasive Web-based Malware." USENIX Security Symposium. 2013.
King, Samuel. T., and Peter M. Chen, "SubVirt Implementing malware with virtual machines." *Security and Privacy, 2006 IEEE Symposium on*. IEEE, 2006, 14 Pages.
Kosoresow, Andrew P., and Steven A. Hofmeyr. "Intrusion detection via system call traces." IEEE software 14.5 (1997): 35-42.
Laureano, Marcos, Carlos Maziero, and Edgard Jamhour. "Intrusion detection in virtual machine environments." Euromicro Conference, 2004. Proceedings. 30th. IEEE, 2004.
Levin, Thomas E., Cynthia E. Irvine, and Thuy D. Nguyen. Least privilege in separation kernels. Naval Postgraduate School Monterey CA Dept of Computer Science, 2006.
Nguyen, Anh M., et al. "Mavmm: Lightweight and purpose built vmm for malware analysis." Computer Security Applications Conference, 2009. ACSAC'09. Annual. IEEE, 2009.
PCT Notification of Transmittal of the International Search Report and the Written Opinion of the International Searching Authority, or the Declaration, International Searching Authority, International Application No. PCT/US2014/071847, dated Mar. 26, 2015, 16 pages.
PCT Notification of Transmittal of the International Search Report and the Written Opinion of the International Searching Authority, or the Declaration, International Searching Authority, International Application No. PCT/US2014/071879, dated /Apr. 28, 2015, 12 pages.
PCT Notification of Transmittal of the International Search Report and the Written Opinion of the International Searching Authority, or the Declaration, International Searching Authority, International Application No. PCT/US2014/071923, dated Mar. 26, 2015, 13 pages.
Steinberg, Udo, and Bernhard Kauer. "NOVA: a microhypervisor-based secure virtuaiization architecture." *Proceedings of the 5th European conference on Computer systems*, ACM, 2010, 14 Pages.
Stumpf, Frederic, et al. "An approach to a trustworthy system architecture using virtualization." Autonomic and trusted computing. Springer Berlin Heidelberg, 2007. 191-202.
Sun, et al., "SecureSwitch: BIOS-Assisted Isolation and Switch between Trusted and Untrusted Commodity OSes," Center for Secure Information Systems, George Mason University, Feb. 26, 2013, 15 pages.
Wojtczuk, Rafal. "Subverting the Xen hypervisor." *Black Hat USA* 2008 (2008), 9 Pages.
Yan, Lok Kwong, et al. "Transparent and Extensible Malware Analysis by Combining Hardware Virtualization and Software Emulation." Internet Society, 2010. Downloaded from https://www.internetsociety.org/sites/default/files/05_1.pdf.
"Mining Specification of Malicious Behavior"—Jha et al, UCSB, Sep. 2007 https://www.cs.ucsb.edu/about.chris/research/doc/esec07.sub.--mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&amumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo , et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

(56) References Cited

OTHER PUBLICATIONS

Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, "Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham, "Insertion, Evasion, and Denial of Service: Eluding Network Intrusion Detection", Secure Networks, ("Ptacek"), (Jan. 1998).
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zang et al., The Effects of Threading, Infection Time, and Multiple-Attacker Collaboration on Malware Propagation, Sep. 2009, IEEE 28th International Symposium on Reliable Distributed Systems, pp. 73-82.

* cited by examiner

CODE INJECTION TECHNIQUE FOR REMEDIATION AT AN ENDPOINT OF A NETWORK

RELATED APPLICATION

The present application claims priority from commonly owned Provisional Patent Application No. 62/141,099, entitled CODE INJECTION TECHNIQUE FOR REMEDIATION AT AN ENDPOINT OF A NETWORK, filed on Mar. 31, 2015, the contents of which are incorporated herein by reference.

BACKGROUND

Technical Field

The present disclosure relates to malware detection systems and, more specifically, to code injection for remediation at an endpoint of a network.

Background Information

Data communication in a network involves the exchange of data between two or more entities interconnected by communication links and sub-networks (segments). The entities are typically software processes executing in operating systems of computers, such as end nodes and intermediate nodes. The intermediate nodes interconnect the communication links and segments to enable transmission of data between the end nodes. A local area network (LAN) is an example of segment that provides relatively short distance communication among the interconnected nodes, whereas a wide area network (WAN) enables long distance communication over links provided by telecommunications facilities. The Internet is an example of a WAN that connects disparate computer networks throughout the world, providing global communication between nodes on various networks.

Malicious software (malware) has become a pervasive problem for nodes coupled to networks, such as the Internet. Malware is often embedded within downloadable content intended to adversely influence or attack normal operations of a node. Whereas operating system vulnerabilities have traditionally been common targets of such malware content, attackers have broaden their attack to exploit vulnerabilities in processes or applications, such as web browsers. For example, malware content may be embedded within objects associated with a web page hosted by a malicious web site.

Various types of security enhanced nodes are often deployed at different segments of the networks. These nodes often employ virtualization systems to provide the enhanced security needed to uncover the presence of malware embedded within ingress content propagating over the different segments. The enhanced security may include anti-virus scanning software that scans the ingress content for viruses and other forms of malware, as well as virtual machines that replay the content to monitor its behavior during execution to detect anomalies that may indicate the presence of malware. However, increasingly sophisticated malware may be able to infect the nodes by, e.g., altering states of resources of the nodes. Moreover, strict specifications for some nodes (e.g., endpoints) may require execution of software, despite known vulnerabilities and potential of infection by malware. Thus, a technique to remediate malware infection in running software is needed.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein provide a technique for injecting code into a suspicious process containing malware executing on a node to enable remediation of the malware at the node. Illustratively, the technique may inject code into the suspicious process during instrumentation of the malware in a micro-virtual machine (micro-VM) to monitor malicious behavior and to enable remediation of that behavior at a node embodied as an endpoint. According to the technique, code may be injected into the suspicious process during instrumentation in the micro-VM of the endpoint to restore states of kernel resources (e.g., memory) that may be infected (i.e., altered) by behavior (actions) of the malware. In one embodiment, execution of the suspicious process and malware on the endpoint may eventually be terminated after monitoring of the malware behavior, while in another embodiment, an operating system image (binary) containing the suspicious process may not be changed. In either embodiment, the code is illustratively injected to provide dynamic, in-process vulnerability patching that enables remediation of the malware behavior at the endpoint.

DESCRIPTION

Figure 1:
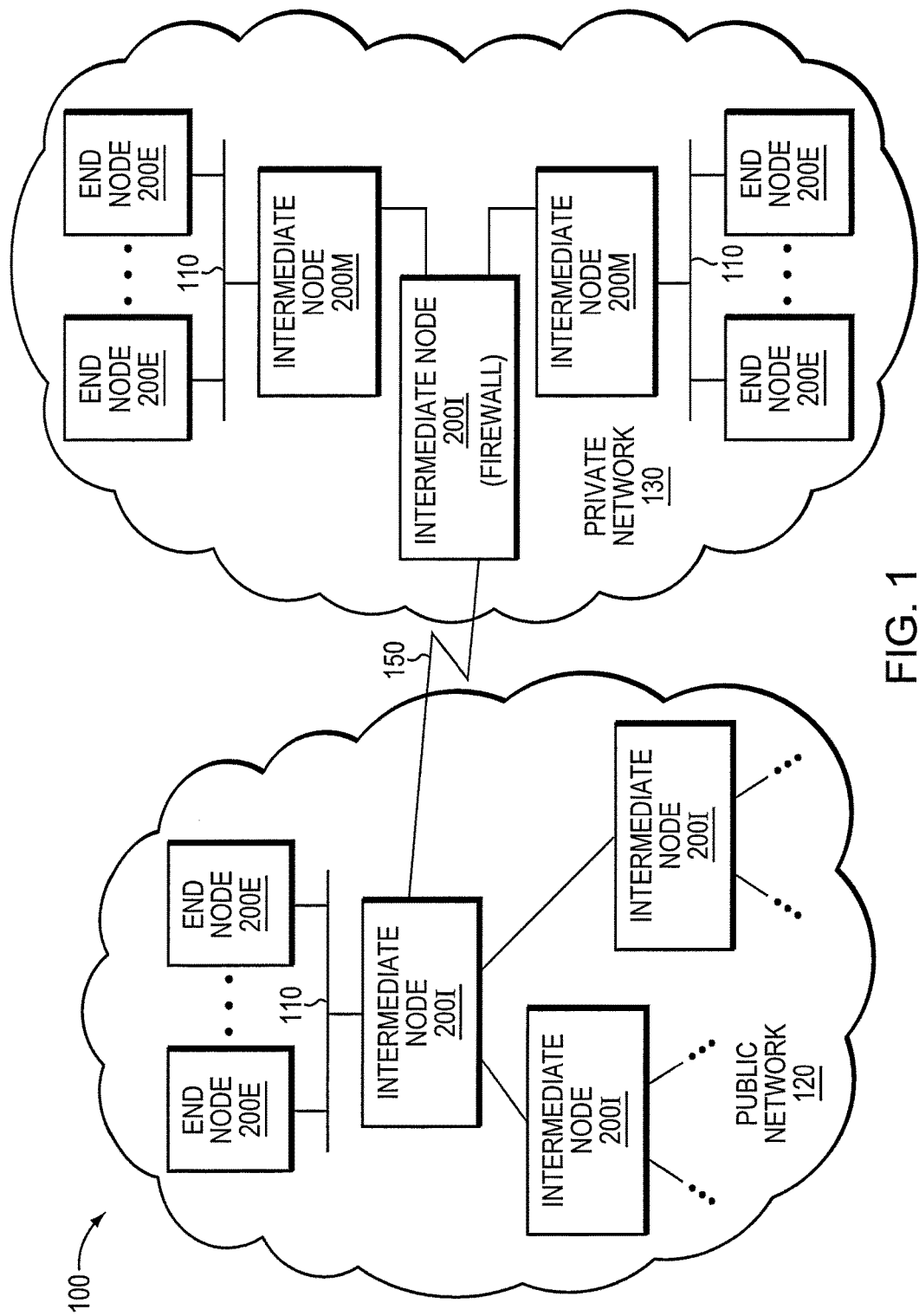
FIG. 1 is a block diagram of a network environment that may be advantageously used with one or more embodiments described herein.

FIG. 1 is a block diagram of a network environment 100 that may be advantageously used with one or more embodiments described herein. The network environment 100 illustratively includes a plurality of networks organized as a public network 120, such as the Internet, and a private network 130, such an organization or enterprise (e.g., customer) network. The networks 120, 130 illustratively include a plurality of network links and segments connected to a plurality of nodes 200. The network links and segments may include local area networks (LANs) 110 and wide area networks (WANs) 150, including wireless networks, interconnected by intermediate nodes $200_I$ to form an internetwork of nodes, wherein the intermediate nodes $200_I$ may include network switches, routers and/or one or more malware detection system (MDS) appliances (intermediate nodes $200_M$) described further herein. As used herein, an appliance may be embodied as any type of general-purpose or special-purpose computer, including a dedicated electronic computing device, adapted to implement a variety of software architectures relating to exploit and malware detection functionality. The term "appliance" should therefore be taken broadly to include such arrangements, in addition to any systems or subsystems configured to perform a management function for exploit and malware detection, and associated with other equipment or systems, such as a network computing device interconnecting the WANs and LANs. The LANs 110 may, in turn, interconnect end nodes $200_E$ which, in the case of private network 130, may be illustratively embodied as endpoints.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent, general-purpose or special-purpose electronic device having network connectivity and, particularly for some embodiments, that may be configured to implement a virtualization system. The nodes 200 illustratively communicate by exchanging packets or messages (i.e., communication traffic) according to a predefined set of protocols, such as the Transmission Control Protocol/Internet Protocol (TCP/IP); however, it should be noted that other protocols, such as the HyperText Transfer Protocol Secure (HTTPS), may be advantageously used with the embodiments herein. In the case of private network 130, the intermediate node $200_I$ may include a firewall or other network device configured to limit or block certain communication (network) traffic in an attempt to protect the endpoints from unauthorized users. Unfortunately, such conventional attempts often fail to protect the endpoints, which may be compromised.

Figure 2:
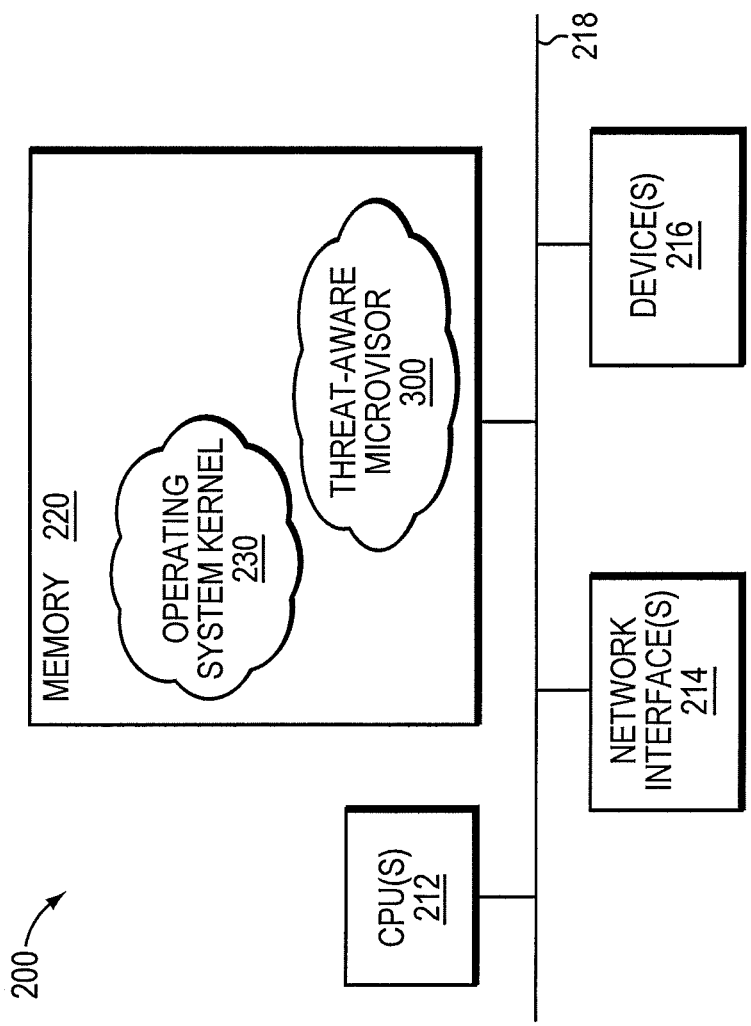
FIG. 2 is a block diagram of a node that may be advantageously used with one or more embodiments described herein.

FIG. 2 is a block diagram of a node 200, e.g., endpoint $200_E$ or MDS appliance $200_M$, that may be advantageously used with one or more embodiments described herein. The node 200 illustratively includes one or more central processing unit (CPUs) 212, a memory 220, one or more network interfaces 214 and one or more devices 216 connected by a system interconnect 218, such as a bus. The devices 216 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 214 may include one or more network ports containing the mechanical, electrical and/or signaling circuitry needed to connect the node to the network 130 to thereby facilitate communication over the network. To that end, the network interface 214 may be configured to transmit and/or receive messages using a variety of communication protocols including, inter alia, TCP/IP and HTTPS.

In one or more embodiments where the MDS appliance $200_M$ is communicatively coupled with the network 130, the network interface 214 may operate as a data capturing device (sometimes referred to as a "tap" or "network tap") that is configured to receive incoming network (data) traffic propagating from public network 120 and into private network 130, and provide at least some of this data traffic or a duplicated copy of the traffic for malware detection. In one embodiment, the MDS appliance may be positioned (deployed) behind the firewall at an ingress point into the private network 130, and at least partially in-line with network devices (e.g., endpoints) so as to subject the incoming traffic to analysis (e.g., through static analysis) and potentially block that traffic which is classified as malware from reaching its destination (e.g., the endpoints). In another embodiment, the static analysis may be at least partially performed by the firewall or other intermediate device, or performed by the network interface 214 (e.g., by CPU 212 and/or a digital signal processor on a network interface card).

The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code, such as threat-aware microvisor 300 as well as modules of malware detection architectures described herein, and manipulate the data structures. Exemplary CPUs may include families of instruction set architectures based on the x86 CPU from Intel Corporation of Santa Clara, Calif. and the x64 CPU from Advanced Micro Devices of Sunnyvale, Calif.

An operating system kernel 230, portions of which are typically resident in memory 220 and executed by the CPU, functionally organizes the node by, inter alia, invoking operations in support of the software program code and application programs executing on the node. A suitable operating system kernel 230 may include the Windows® series of operating systems from Microsoft Corp of Redmond, Wash., the MAC OS® and IOS® series of operating systems from Apple Inc. of Cupertino, Calif., the Linux operating system and versions of the Android™ operating system from Google, Inc. of Mountain View, Calif., among others. Suitable application programs may include Adobe Reader® from Adobe Systems Inc. of San Jose, Calif. and Microsoft Word from Microsoft Corp of Redmond, Wash. Illustratively, the software program code may be implemented as operating system processes of the kernel 230. As used herein, a process (e.g., a user mode process) is an instance of software program code (e.g., an application program) executing in the operating system that may be separated (decomposed) into one or more threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer, e.g., application, programs stored in memory, alternative embodiments also include the code, processes and programs being embodied as engines and/or modules consisting of hardware, software, firmware, or combinations thereof.

Threat-Aware Microvisor

Figure 3:
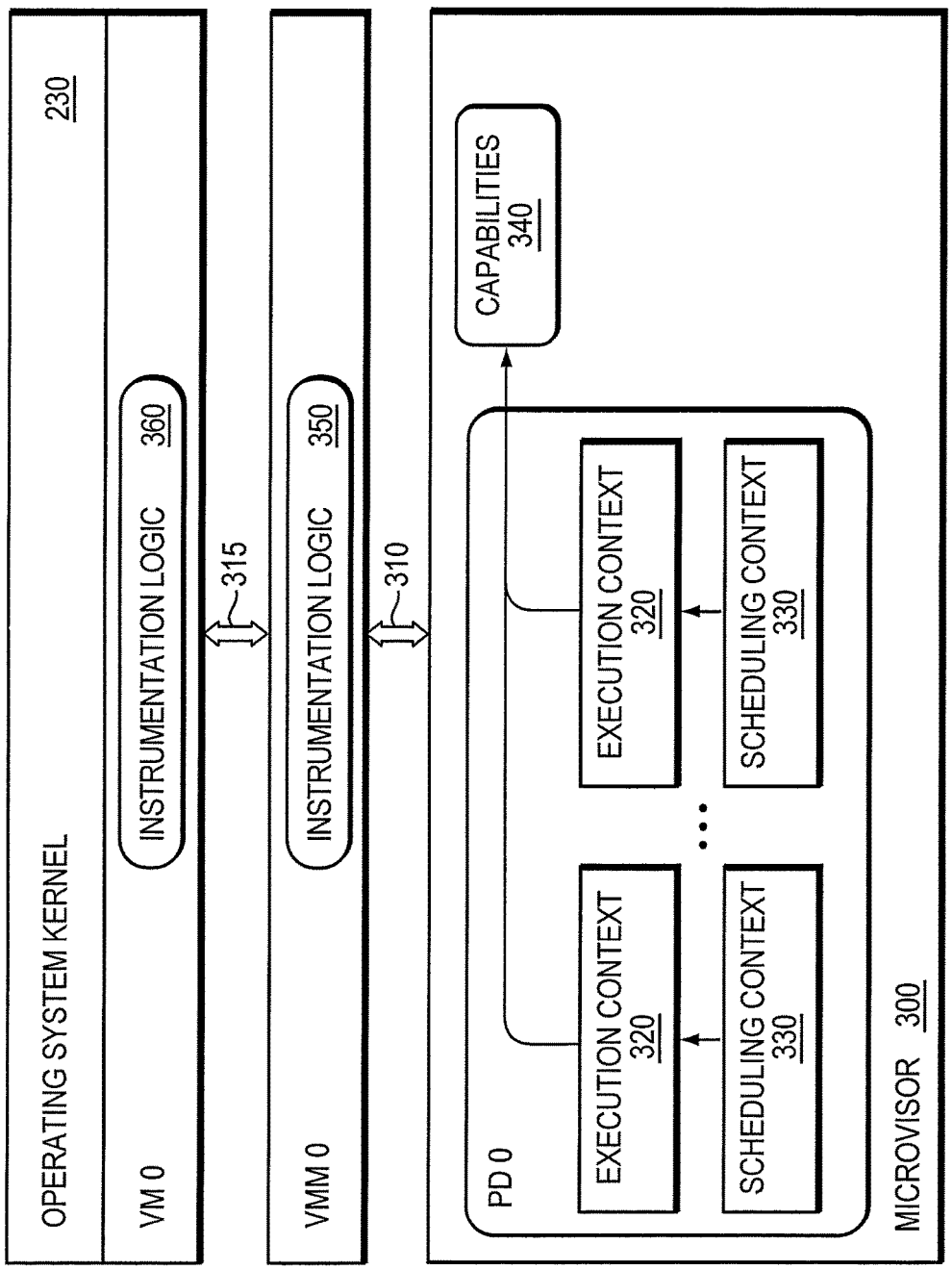
FIG. 3 is a block diagram of the threat-aware microvisor that may be advantageously used with one or more embodiments described herein.

FIG. 3 is a block diagram of the threat-aware microvisor 300 that may be advantageously used with one or more embodiments described herein. The threat-aware microvisor (hereinafter "microvisor") may be configured to facilitate run-time security analysis, including exploit and malware detection and threat intelligence, of operating system processes executing on the node 200. To that end, the microvisor may be embodied as a light-weight module disposed or layered beneath (underlying, i.e., directly on native hardware) the operating system kernel 230 of the node to thereby virtualize the hardware and control privileges (i.e., access control permissions) to kernel (e.g., hardware) resources of the node 200 that are typically controlled by the operating system kernel. Illustratively, the kernel resources may include (physical) CPU(s) 212, memory 220, network interface(s) 214, and devices 216. The microvisor 300 may be configured to control access to one or more of the resources in response to a request by an operating system process to access the resource.

As a light-weight module, the microvisor 300 may provide a virtualization layer having less functionality than a typical hypervisor. Therefore, as used herein, the microvisor 300 is a module (component) that underlies the operating system kernel 230 and includes the functionality of a microkernel (e.g., protection domains, execution contexts, capabilities and scheduling), as well as a subset of the functionality of a hypervisor (e.g., hyper-calls to implement a virtual machine monitor). The microvisor may cooperate with a unique virtual machine monitor (VMM), i.e., a type 0 VMM, to provide additional virtualization functionality in an operationally and resource efficient manner. Unlike a type 1 or type 2 VMM (hypervisor), the type 0 VMM (VMM 0) does not fully virtualize the kernel (hardware) resources of the node and supports execution of only one entire operating system/instance inside one virtual machine, i.e., VM 0. VMM 0 may thus instantiate VM 0 as a container for the operating system kernel 230 and its kernel resources. In an embodiment, VMM 0 may instantiate VM 0 as a module having instrumentation logic 360 directed to determination of an exploit or malware in any suspicious operating system process (kernel or user mode). Illustratively, VMM 0 is a pass-through module configured to expose the kernel resources of the node (as controlled by microvisor 300) to the operating system kernel 230. VMM 0 may also expose resources such as virtual CPUs (threads), wherein there is one-to-one mapping between the number of physical CPUs and the number of virtual CPUs that VMM 0 exposes to the operating system kernel 230. To that end, VMM 0 may enable communication between the operating system kernel (i.e., VM 0) and the microvisor over privileged interfaces 315 and 310.

The VMM 0 may include software program code (e.g., executable machine code) in the form of instrumentation logic 350 (including decision logic) configured to analyze one or more interception points originated by one or more operating system processes to invoke the services, e.g., accesses to the kernel resources, of the operating system kernel 230. As used herein, an interception point is a point in an instruction stream where control passes to (e.g., is intercepted by) either the microvisor, VMM 0 or another virtual machine. Illustratively, VMM 0 may contain computer executable instructions executed by the CPU 212 to perform operations that initialize and implement the instrumentation logic 350, as well as operations that spawn, configure, and control/implement VM 0 and its instrumentation logic 360.

In an embodiment, the microvisor 300 may be organized to include a protection domain illustratively bound to VM 0. As used herein, a protection domain is a container for various data structures, such as execution contexts, scheduling contexts, and capabilities associated with the kernel resources accessible by an operating system process. Illustratively, the protection domain may function at a granularity of an operating system process (e.g., a user mode process) and, thus, is a representation of the process. Accordingly, the microvisor may provide a protection domain for the process and its run-time threads executing in the operating system. A main protection domain (PD 0) of the microvisor controls all of the kernel resources available to the operating system kernel 230 (and, hence, the user mode process) of VM 0 via VMM 0 and, to that end, may be associated with the services provided to the user mode process by the kernel 230.

An execution context 320 is illustratively a representation of a thread (associated with an operating system process) and, to that end, defines a state of the thread for execution on CPU 212. In an embodiment, the execution context may include inter alia (i) contents of CPU registers, (ii) pointers/values on a stack, (iii) a program counter, and/or (iv) allocation of memory via, e.g., memory pages. The execution context 320 is thus a static view of the state of thread and, therefore, its associated process. Accordingly, the thread executes within the protection domain associated with the operating system process of which the thread is a part. For the thread to execute on a CPU 212 (e.g., as a virtual CPU), its execution context 320 is tightly linked to a scheduling context 330, which may be configured to provide information for scheduling the execution context 320 for execution on the CPU 212. Illustratively, the scheduling context information may include a priority and a quantum time for execution of its linked execution context on CPU 212.

In an embodiment, the capabilities 340 may be organized as a set of access control permissions to the kernel resources to which the thread may request access. Each time the execution context 320 of a thread requests access to a kernel resource, the capabilities 340 are examined. There is illustratively one set of capabilities 340 for each protection domain, such that access to kernel resources by each execution context 320 (i.e., each thread of an execution context) of a protection domain may be defined by the set of capabilities 340. For example, physical addresses of pages of memory 220 (resulting from mappings of virtual addresses to physical addresses) may have associated access permissions (e.g., read, write, read-write) within the protection domain. To enable an execution context 320 to access a kernel resource, such as a memory page, the physical address of the page may have a capability 340 that defines how the execution context 320 may reference that page. Illustratively, the capabilities may be examined by hardware (e.g., a hardware page fault upon a memory access violation) or by program code. A violation of a capability in a protection domain may be an interception point, which returns control to the VM (e.g., VM 0) bound to the protection domain.

Malware Detection Endpoint Architecture

Figure 4:
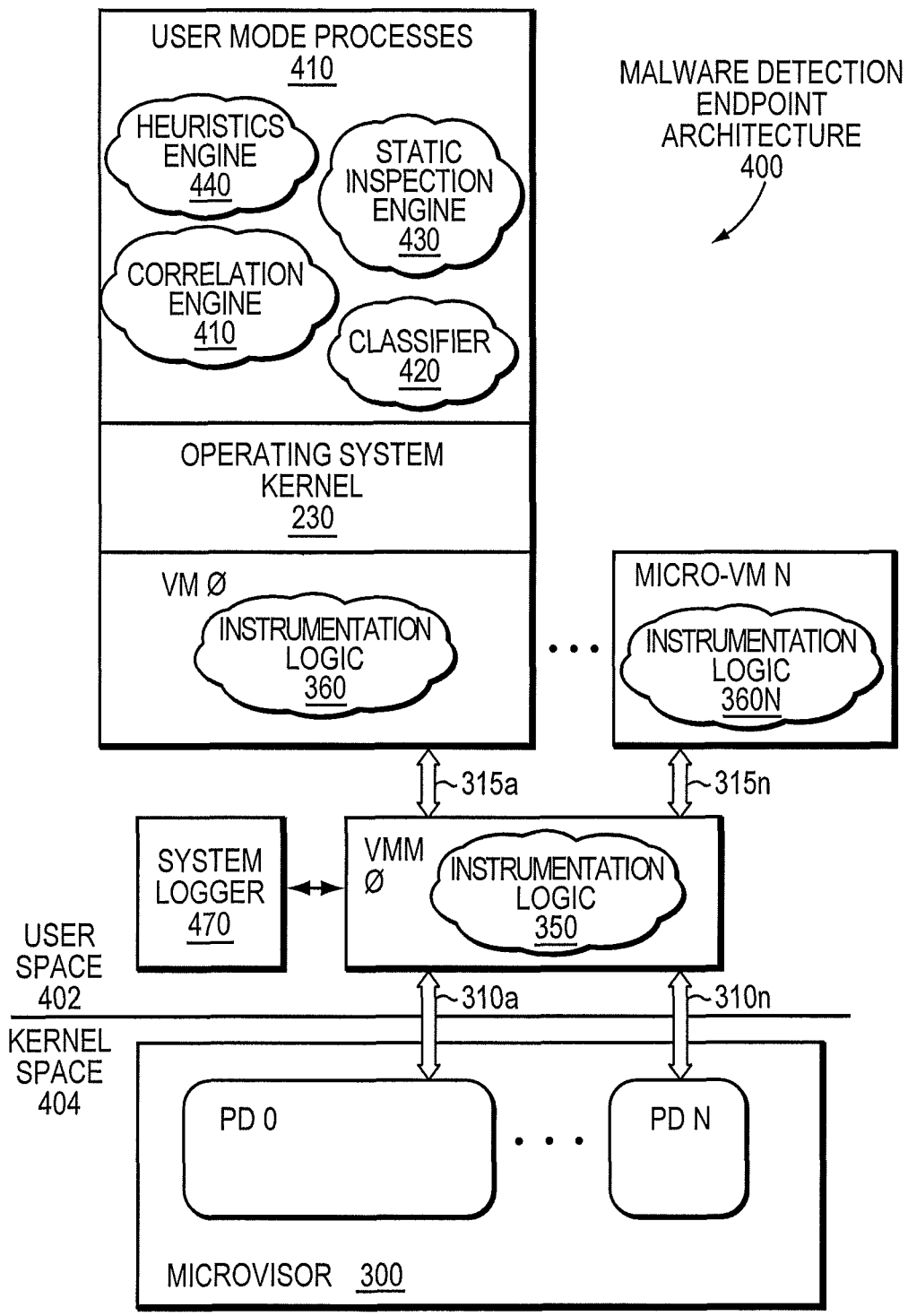
FIG. 4 is a block diagram of a malware detection endpoint architecture that may be advantageously used with one or more embodiments described herein.

In an embodiment, the threat-aware microvisor 300 may be deployed in a micro-virtualization architecture as a module of a virtualization system executing on the endpoint $200_E$ to provide exploit and malware detection within the network environment 100. FIG. 4 is a block diagram of a malware detection endpoint architecture 400 that may be advantageously used with one or more embodiments described herein. Illustratively, the architecture 400 may organize the memory 220 of the endpoint $200_E$ as a user space 402 and a kernel space 404. In an embodiment, the microvisor may underlie the operating system kernel 230 and execute in the kernel space 404 of the architecture 400 to control access to the kernel resources of the endpoint $200_E$ for any operating system process (kernel or user mode). Notably, the microvisor 300 executes at the highest privilege level of the hardware (CPU) to thereby virtualize access to the kernel resources of the endpoint in a light-weight manner that does not share those resources among user mode processes 410 when requesting the services of the operating system kernel 230. That is, there is one-to-one mapping between the resources and the operating system kernel, such that the resources are not shared.

A system call illustratively provides an interception point at which a change in privilege levels occurs in the operating system, i.e., from a privilege level of the user mode process to a privilege level of the operating system kernel. VMM 0 may intercept the system call and examine a state of the process issuing (sending) the call. The instrumentation logic 350 of VMM 0 may analyze the system call to determine whether the call is suspicious and, if so, instantiate (spawn) one or more "micro" virtual machines (VMs) equipped with monitoring functions that cooperate with the microvisor to detect anomalous behavior which may be used in determining an exploit or malware.

As used herein, an exploit may be construed as information (e.g., executable code, data, one or more commands provided by a user or attacker) that attempts to take advantage of a computer program or system vulnerability, often employing malware. Typically, a vulnerability may be a coding error or artifact of a computer program that allows an attacker to alter legitimate control flow during processing of the computer program by an electronic device (such as a node) and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed by an exploit to harm or co-opt operation of an electronic device or misappropriate, modify or delete data. Conventionally, malware may often be designed with malicious intent, and may be used to facilitate an exploit. For convenience, the term "malware" may be used herein to describe a malicious attack, and encompass both malicious code and exploits detectable in accordance with the disclosure herein.

As used herein, the term "micro" VM denotes a virtual machine serving as a container that is restricted to a process (as opposed to VM 0 which is spawned as a container for the entire operating system.) Such spawning of a micro-VM may result in creation of an instance of another module (i.e., micro-VM N) that is substantially similar to VM 0, but with different (e.g., additional) instrumentation logic 360N illustratively directed to determination of malware in the suspicious process by, e.g., monitoring its behavior. In an embodiment, the spawned micro-VM illustratively encapsulates an operating system process, such as a user mode process 410. In terms of execution, operation of the process is controlled and synchronized by the operating system kernel 230; however, in terms of access to kernel resources, operation of the encapsulated process is controlled by VMM 0. Notably, the resources appear to be isolated within each spawned micro-VM such that each respective encapsulated process appears to have exclusive control of the resources. In other words, access to kernel resources is synchronized among the micro-VMs and VM 0 by VMM 0 rather than virtually shared. Similar to VM 0, each micro-VM may be configured to communicate with the microvisor (via VMM 0) over privileged interfaces (e.g., 315n and 310n).

In an embodiment, the privileged interfaces 310 and 315 may be embodied as a set of defined hyper-calls, which are illustratively inter process communication (IPC) messages exposed (available) to VMM 0 and VM 0 (including any spawned micro-VMs). The hyper-calls are generally originated by VMM 0 and directed to the microvisor 300 over privileged interface 310, although VM0 and the micro-VMs may also originate one or more hyper-calls (IPC messages) directed to the microvisor over privileged interface 315. However, the hyper-calls originated by VM 0 and the micro-VMs may be more restricted than those originated by VMM 0.

In an embodiment, the microvisor 300 may be organized to include a plurality of protection domains (e.g., PD 0-N) illustratively bound to VM 0 and one or more micro-VMs, respectively. For example, the spawned micro-VM (e.g., micro-VM N) is illustratively associated with (bound to) a copy of PD 0 (e.g., PD N) which, in turn, may be bound to the process, wherein such binding may occur through memory context switching. In response to a decision to spawn the micro-VM N, VMM 0 may issue a hyper-call over interface 310 to the microvisor requesting creation of the protection domain PD N. Upon receiving the hyper-call, the microvisor 300 may copy (i.e., "clone") the data structures (e.g., execution contexts, scheduling contexts and capabilities) of PD 0 to create PD N for the micro-VM N, wherein PD N has essentially the same structure as PD 0 except for the capabilities associated with the kernel resources. The capabilities for PD N may limit or restrict access to one or more of the kernel resources as instructed through one or more hyper-calls from, e.g., VMM 0 and/or micro-VM N over interface 310n to the microvisor. Accordingly, the microvisor 300 may contain computer executable instructions executed by the CPU 212 to perform operations that initialize, clone and configure the protection domains.

Advantageously, the microvisor 300 may be organized as separate protection domain containers for the operating system kernel 230 (PD 0) and one or more operating system processes (PD N) to facilitate further monitoring and/or understanding of behaviors of a process and its threads. Such organization of the microvisor also enforces separation between the protection domains to control the activity of the monitored process. Moreover, the microvisor 300 may enforce access to the kernel resources through the use of variously configured capabilities of the separate protection domains. Unlike previous virtualization systems, separation of the protection domains to control access to kernel resources at a process granularity enables detection of anomalous behavior of malware. That is, in addition to enforcing access to kernel resources, the microvisor enables analysis of the operation of a process within a spawned micro-VM to detect exploits or other malicious code threats that may constitute malware.

The user mode processes 410 and operating system kernel 230 may execute in the user space 402 of the endpoint architecture 400, although it will be understood to those skilled in the art that the user mode processes may execute in another address space defined by the operating system kernel. Illustratively, the operating system kernel 230 may execute under control of the microvisor at a privilege level (i.e., a logical privilege level) lower than a highest privilege level of the microvisor, but at a higher CPU privilege level than that of the user mode processes 410. In addition, VMM 0 and its spawned VMs (e.g., VM 0 and micro-VM N) may execute in user space 402 of the architecture 400. As a type 0 virtual machine monitor, VMM 0 (and its spawned VM 0 and micro-VMs) may execute at the highest (logical) privilege level of the microvisor. That is, VMM 0 (and its spawned VM 0 and micro-VMs) may operate under control of the microvisor at the highest microvisor privilege level, but may not directly operate at the highest CPU (hardware) privilege level.

Illustratively, the instrumentation logic of VMM 0 (and its spawned micro-VMs) may include monitoring logic configured to monitor and collect capability violations (e.g., generated by CPU 212) in response to one or more interception points to thereby infer malware. Inference of malware may also be realized through sequences of interception points wherein, for example, a system call followed by another system call having certain parameters may lead to an inference that the process sending the calls is malware. The interception point thus provides an opportunity for VMM 0 to perform "light-weight" (i.e., limited so as to maintain user experience at the endpoint with little performance degradation) analysis to evaluate a state of the process in order to detect possible malware without requiring any policy enforcement. VMM 0 may then decide to spawn a micro-VM and configure the capabilities of its protection domain to enable deeper monitoring and analysis (e.g., through interception points and capability violations) in order to determine whether the process includes malware. Notably, the analysis may also classify the process as a type of malware (e.g., a stack overflow) and may even identify the same. As a result, the invocation of instrumentation and monitoring logic of VMM 0 and its spawned VMs in response to interception points originated by operating system processes and capability violations generated by the microvisor advantageously enhance the virtualization system described herein to provide an exploit and malware detection system configured for run-time security analysis of the operating system processes executing on the endpoint.

VMM 0 may also log the state of the monitored process within system logger 470. In an embodiment, the state of the process may be realized through the contents of the execution context 320 (e.g., CPU registers, stack, program counter, and/or allocation of memory) executing at the time of each capability violation. In addition, the state of the process may be realized through correlation of various activities or behavior of the monitored process. The logged state of the process may thereafter be exported from the system logger 470 to the MDS $200_M$ of the network environment 100 by, e.g., forwarding the state as one or more IPC messages through VMM 0 (VM 0) and onto a network protocol stack (not shown) of the operating system kernel. The network protocol stack may then format the messages as one or more packets according to, e.g., a syslog protocol such as RFC 5434 available from IETF, for transmission over the network to the MDS appliance $200_M$.

Malware Detection

Exploit and malware detection on the endpoint may be performed in accordance with one or more processes embodied as software modules or engines containing computer executable instructions executed by the CPU to detect suspicious and/or malicious behaviors of an operating system process (including an application program) when, e.g., executing contents of an object, and to correlate and classify the detected behaviors as indicative of malware (i.e., a matter of probability). Notably, the endpoint may perform (implement) exploit and malware detection as background processing (i.e., minor use of endpoint resources) with data processing being implemented as its primary processing (e.g., in the foreground having majority use of endpoint resources), whereas the MDS appliance implements such detection as its primary processing (i.e., majority use of appliance resources). Detection of a suspicious and/or malicious object may be performed at the endpoint by static and dynamic analysis of the object. As used herein, an object may include a logical entity such as, for example, a web page, email, email attachment, file or universal resource locator (URL). Static analysis may perform light-weight (quick) examination of the object to determine whether it is suspicious, while dynamic analysis may instrument the behavior of the object as the operating system process executes (runs) via capability violations of, e.g., operating system events. A correlation engine 410 and a classifier 420 may thereafter cooperate to perform correlation and classification of the detected behaviors as malicious or not. That is, the correlation engine 410 and classifier 420 may cooperate to analyze and classify observed behaviors of the object (based on the events) as indicative of malware.

In an embodiment, the static analysis may perform light-weight examination of the object (including a network packet) to determine whether it is suspicious and/or malicious. To that end, the static analysis may include a static inspection engine 430 and a heuristics engine 440 executing as user mode processes of the operating system kernel 230. The static inspection engine 430 and heuristics engine 440 may employ statistical analysis techniques, including the use of vulnerability/exploit signatures and heuristics, to perform non-behavioral analysis in order to detect anomalous characteristics (i.e., suspiciousness and/or malware) without execution (i.e., monitoring run-time behavior) of the object. For example, the static inspection engine 430 may employ signatures (referred to as vulnerability or exploit "indicators") to match content (e.g., bit patterns) of the object with patterns of the indicators in order to gather information that may be indicative of suspiciousness and/or malware. The heuristics engine 440 may apply rules and/or policies to detect anomalous characteristics of the object in order to identify whether the object is suspect and deserving of further analysis or whether it is non-suspect (i.e., benign) and not in need of further analysis. The statistical analysis techniques may produce static analysis results that include, e.g., identification of communication protocol anomalies and/or suspect source addresses of known malicious servers.

The dynamic analysis may include exploit detection performed by, e.g., the microvisor 300 and micro-VM N to observe behaviors of the object. In an embodiment, exploit detection at the endpoint does not generally wait for results from the static analysis. The behaviors of the object may be observed by instrumenting the object (using, e.g., instrumentation logic 360N) as the operating system process runs at micro-VM N, wherein the observed run-time behaviors may be captured by the microvisor 300 and VMM 0, and provided to the correlation engine 410 as dynamic analysis results.

Illustratively, monitors may be employed during the dynamic analysis to monitor the run-time behaviors of the object and capture any resulting activity. The monitors may be embodied as capability violations configured to trace particular operating system events. During instrumenting of the object at the micro-VM, the system events may trigger capability violations (e.g., exceptions or traps) generated by the microvisor 300 to enable monitoring of the object's behaviors during run-time.

The static analysis results and dynamic analysis results may be stored in memory 220 (e.g., in system logger 470) and provided to the correlation engine 410, which may provide correlation information to the classifier 420. Alternatively, the results or events may be provided or reported to the MDS appliance $200_M$ for correlation. The correlation engine 410 may be configured to operate on correlation rules that define, among other things, sequences of known malicious events (if-then statements with respect to, e.g., attempts by a process to change memory in a certain way that is known to be malicious). The events may collectively correlate to malicious behavior. As noted, a micro-VM may be spawned to instrument a suspect process (object) and cooperate with the microvisor 300 and VMM 0 to generate capability violations in response to interception points, which capability violations are provided as dynamic analysis result inputs to the correlation engine 410. The rules of the correlation engine 410 may then be correlated against those dynamic analysis results, as well as static analysis results, to generate correlation information pertaining to, e.g., a level of risk or a numerical score used to arrive at a decision of (deduce) maliciousness. The classifier 420 may be embodied as a classification engine executing as a user mode process of the operating system kernel 230 and configured to use the correlation information provided by correlation engine 410 to render a decision as to whether the object is malicious. Illustratively, the classifier 420 may be configured to classify the correlation information, including monitored behaviors (expected and unexpected/anomalous) and capability violations, of the object relative to those of known malware and benign content.

Malware Detection Appliance Architecture

In one or more embodiments, the MDS appliance $200_M$ may be embodied as an intermediate node configured to analyze communication traffic associated with one or more endpoints $200_E$ coupled to a network segment, such as segment 110, of a network, such as private network 130. The MDS appliance $200_M$ may be illustratively positioned (e.g., as an ingress/egress point) within the private network 130 or segment 110 to intercept (i.e., capture) the traffic. In one or more embodiments, the MDS appliance may manage each endpoint by, e.g., requesting replay and instrumentation of the traffic by the endpoint $200_E$. The intercepted traffic may also be replayed and instrumented (i.e., monitored) at the appliance. Thereafter, the instrumented traffic may be correlated at the MDS appliance $200_M$, and the appliance may be configured to communicate with and instruct the endpoint to, e.g., perform an action and receive notification of that action being performed.

Illustratively, the MDS appliance $200_M$ may include functionality directed to replaying of communication traffic and correlating instrumentation of that traffic with actions resulting from that traffic at the endpoint. For every network packet received, the appliance may run a heuristic to compute a flow, as appropriate, for the packet, and then create (spawn) a virtual machine (VM) to emulate the endpoint using an image of an operating system (guest operating system and one or more applications) configured to replicate a software processing environment of the endpoint, e.g., based on a payload (object) of the packet to be replayed and instrumented. As noted, an object may include a logical entity such as, for example, a web page, an email or email attachment, an executable (i.e., binary or script), a file (which may contain an executable), or URL. Information as to an appropriate processing environment may be provided by the packet itself, e.g., the packet header may identify the packet type, for example, a document such as a Portable Document Format (PDF) document and, thus, the processing environment may include a document reader, such as a PDF reader from Adobe Systems Inc. Additionally, or in alternative embodiments, information may also be provided by the endpoint (such as the destination endpoint as specified in the packet) to the MDS appliance indicating a type of application software (process) executing within the operating system on the endpoint. The appliance may then launch a copy of the application along with appropriate instrumentation to process each object. For example, assume the MDS appliance $200_M$ replays HTTPS traffic received at the endpoint which executes, inter alia, an application (i.e., a web browser). The appliance may capture the communication (HTTPS) traffic destined to the endpoint, spawn the VM and launch a copy of the web browser along with instrumentation to monitor the traffic.

Figure 5:
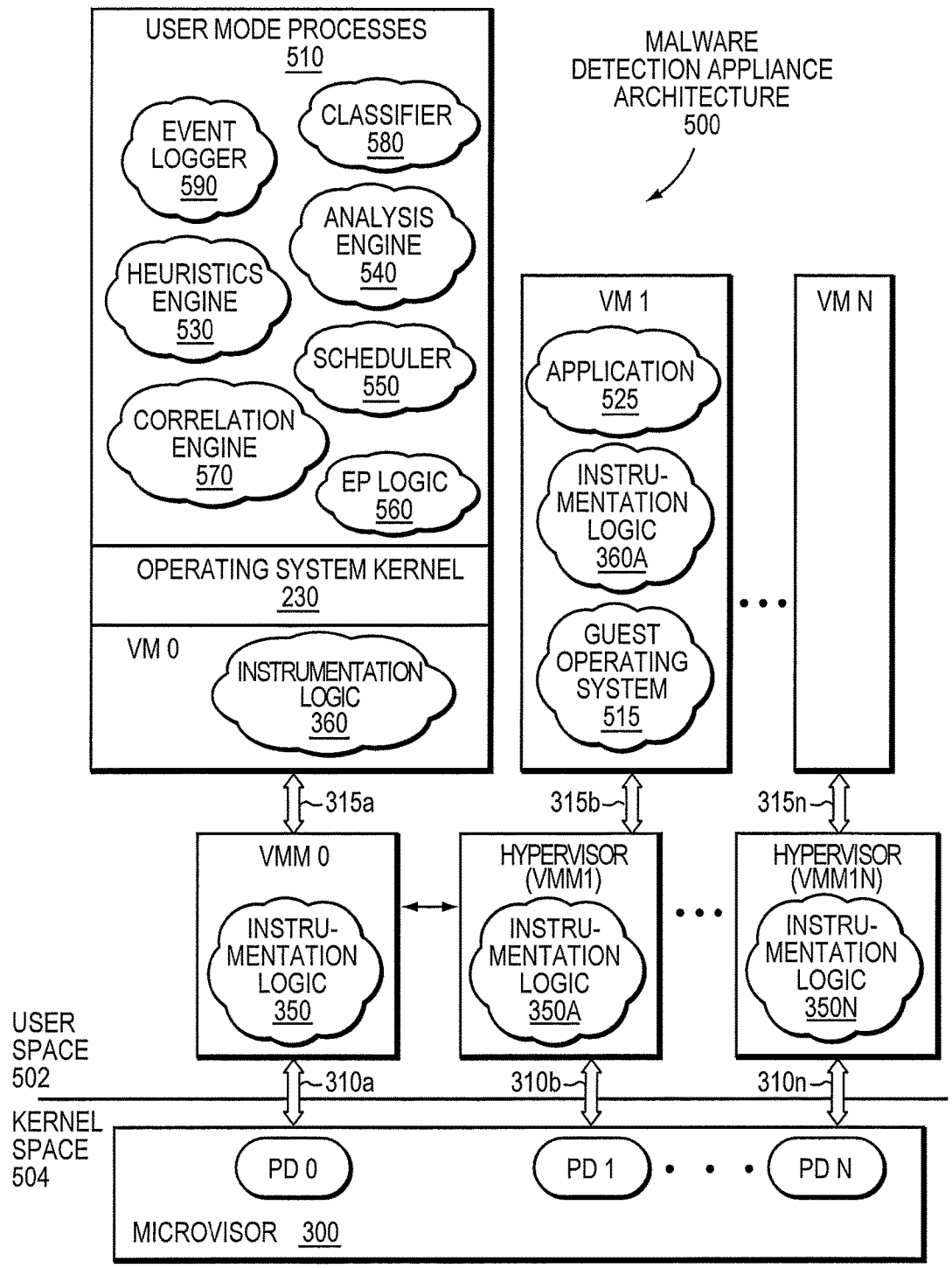
FIG. 5 is a block diagram of a malware detection appliance architecture that may be advantageously used with one or more embodiments described herein.

In an embodiment, the threat-aware microvisor 300 may be deployed in a virtualization architecture as a module of a virtualization system executing on the MDS appliance $200_M$ to provide exploit and malware detection within the network environment 100. FIG. 5 is a block diagram of a malware detection appliance architecture 500 that may be advantageously used with one or more embodiments described herein. Illustratively, the architecture 500 may organize the memory 220 of the MDS appliance $200_M$ as a user space 502 and a kernel space 504. The microvisor may underlie the operating system kernel 230 and execute at the highest privilege level of the CPU within the kernel space 504 of the architecture 500 to control access to the kernel resources of the appliance $200_M$ for any operating system process (kernel or user mode). User mode processes 510 and operating system kernel 230 may execute in the user space 502 of the appliance architecture 500. Illustratively, the operating system kernel 230 may execute under control of the microvisor at a privilege level (i.e., a logical privilege level) lower than a highest privilege level of the microvisor, but at a higher CPU privilege level than that of the user mode processes 510. In addition, VMM 0 and VM 0 may execute in user space 502 under control of the microvisor at the highest microvisor privilege level, but may not directly operate at the highest CPU (hardware) privilege level.

One or more hypervisors, e.g., type 1 VMM, may be disposed as one or more modules over the microvisor 300 and operate in user space 502 of the architecture 500 under control of the microvisor at the highest microvisor privilege level to provide additional layers of virtualization for the MDS appliance $200_M$. Illustratively, each hypervisor provides full virtualization of kernel (hardware) resources and supports execution of one or more entire operating system instances (i.e., guest operating system) inside one or more full virtual machines. In one or more embodiments, the full virtual machine (VM) may simulate a computer (machine) based on specifications of a hypothetical (abstract) computer or based on an architecture and functions of an actual (real) computer. To that end, a hypervisor (e.g., VMM 1) may instantiate a full VM (e.g., VM 1) as a module provisioned with a software profile that includes a guest operating system (e.g., guest operating system 515) and any associated application programs (e.g., application 525), as well as instrumentation logic (e.g., instrumentation logic 360A) directed to determination of malware in any suspicious object or application executing on the guest operating system. Illustratively, the hypervisor may instantiate the full VM from a pool of VMs configured to closely simulate various target operating environments (e.g., software profiles) in which the malware is to be analyzed. The software profile (e.g., guest operating system and/or application program) provisioned and configured in the VM may be different (e.g., in vendor, type and/or version) from the software profile provisioned and configured in other instantiated VMs (e.g., VM N).

The instantiated VM (e.g., VM 1) is illustratively associated with (bound to) a copy of PD 0 (e.g., PD 1), wherein such binding may occur through memory context switching. In response to a decision to instantiate (spawn) the VM 1, VMM 1 may issue a hyper-call over interface 310b to the microvisor requesting creation of the protection domain PD 1. Upon receiving the hyper-call, the microvisor 300 may copy (i.e., "clone") the data structures (e.g., execution contexts, scheduling contexts and capabilities) of PD 0 to create PD 1 for the VM 1, wherein PD 1 has essentially the same structure as PD 0 except for the capabilities associated with the kernel resources. The capabilities for PD 1 may limit or restrict access to one or more of the kernel resources as instructed through one or more hyper-calls from, e.g., VMM 1 and/or VM 1 over interface 310b to the microvisor.

Illustratively, each hypervisor (e.g., VMM 1-N) may contain computer executable instructions executed by the CPU 212 to perform operations that initialize and configure the instrumentation logic (e.g., instrumentation logic 350A-N), as well as operations that spawn, configure, and control/implement the VM (e.g., VM 1-N) and their instrumentation logic (e.g., 360A). In an embodiment, there is illustratively one hypervisor (e.g., VMM 1-N) for each VM (e.g., VMs 1-N), wherein each VM may be used to emulate an endpoint. The MDS appliance $200_M$ may not emulate every endpoint on, e.g., a segment of the network 130, but when a suspicious object (such as, e.g., a file of a network packet) is identified, the VMM 1 of the appliance may create (spawn) a full VM 1 to analyze that object. The virtualization layers of the MDS appliance $200_M$ may cooperate to implement an abstraction of virtual devices exposed as, e.g., virtual network interfaces to the VMs, as opposed to the real network interfaces exposed to the micro-VMs of the endpoint.

The user mode processes 510 executing on the MDS appliance $200_M$ may include a heuristic engine 530 that, in response to receiving communication traffic, is configured to run one or more heuristics to determine whether the traffic (e.g., an object of a packet) is suspicious. Illustratively, the heuristic engine may use pre-defined anomalous behaviors (monitored activity) of verified exploits and malware to, e.g., identify communication protocol anomalies and/or suspect source addresses of known malicious servers. For example, the heuristic engine may examine metadata or attributes of the object and/or a code image (e.g., a binary image of an executable) of the object to determine whether a portion of the object matches a predetermined pattern or signature associated with a known type of malware. The heuristic engine 530 may provide the packet of the suspicious traffic to one or more processes 510 embodied as analysis engine 540. In an embodiment, the analysis engine 540 may be configured to perform static analysis of the object of the packet to, e.g., identify software profile information associated with an operating system instance for execution in a full VM (virtualizing all kernel resources).

The analysis engine 540 may also be configured to analyze other content of the packet (e.g., destination address of a network header) to determine its destination (i.e., the endpoint). To that end, the analysis engine 540 may be configured to cooperate with a module, e.g., endpoint (EP) logic 560, to communicate with the endpoint $200_E$, e.g., to identify and/or acquire information (including the software profile) associated with execution of the malware on the endpoint. Illustratively, communication with the endpoint may be effected by, e.g., forwarding one or more IPC messages to a network protocol stack (not shown) of the operating system kernel 230. The network protocol stack may then format the messages as one or more packets for transmission over the network to the endpoint. The analysis engine 540 may then provide the software profile information to another process embodied as scheduler 550, which may coordinate with the hypervisor, e.g., VMM 1, to spawn a VM, e.g., VM 1, to replay the traffic.

When replaying the traffic, the analysis engine 540 may employ the EP logic 560 to invoke appropriate instrumentation logic 360A of VM 1 to enable communication with the endpoint to perform dynamic analysis and/or correlation of the suspicious object. In an embodiment, correlation (as described herein) may be performed by one or more user mode processes embodied as a correlation engine 570. The instrumentation logic 360A may be configured to monitor different types of objects, such as payloads of network (web) and email packets, although alternatively, there could be separate web-based and email-based MDS appliances, each of which may be deployed the same way and configured to perform that same work. The MDS appliance $200_M$ may include a module that communicates with a similar module on the endpoint to perform the requested instrumentation. For example in the case of email objects, the application may be an email reader that analyzes email traffic captured by the appliance (and endpoint).

During instrumentation (monitoring) in VM 1, the object may manifest behaviors that are captured by the microvisor and VMM 1. That is, the object may execute within the software profile of VM 1 and its monitored operation (behaviors) observed. The microvisor 300 and VMM 1 may record any resulting activity as, e.g., an event within a database of another user mode process embodied as an event logger 590. In addition, the activity of the object (including the event) may be provided to the correlation engine 570 and to yet another user mode process embodied as a classifier 580 for classification and/or validation of the object as, e.g., malware. Illustratively, correlation engine 570 may be configured to correlate observed behaviors (e.g., results of dynamic analysis) with known malware and/or benign objects (embodied as defined rules) and generate an output (e.g., a level of risk or a numerical score associated with an object) that is provided to the classifier. The classifier 580 may be configured to classify the observed behaviors (expected and unexpected/anomalous) and capability violations of the object relative to those of known malware and benign content to render a decision of malware, i.e., validate the monitored operation of the object as malicious activity, based on the risk level or score exceeding a probability threshold.

Operationally, the MDS appliance may intercept (i.e., receive) and store communication traffic flowing over the network that is destined to the endpoints. The appliance may analyze the traffic and communicate with the endpoints over the network using a messaging protocol that encapsulates an object of interest (e.g., a file of a network packet). Illustratively, the MDS appliance may deploy the network protocol stack, e.g., of the operating system kernel 230 configured to employ a protocol to communicate with the endpoints. For example, the EP logic 560 may notify an endpoint to replay the object using a network message having a MAC address (layer 2 connectivity) and/or IP address of the endpoint (layer 3 connectivity).

Code Injection for Remediation

The embodiments described herein provide a technique for injecting code into a suspicious process containing malware executing on a node to enable remediation at the node. Illustratively, the technique may inject code into the suspicious process (i.e., inject instructions into memory within an address space of process) during instrumentation of the malware in a micro-VM to monitor malicious behavior and to enable remediation of that behavior at a node embodied as an endpoint. According to the technique, code may be injected into the suspicious process during instrumentation in the micro-VM of the endpoint to restore states of kernel resources (e.g., memory) that may be infected and altered by behavior (actions) of the malware. Notably, restoration of kernel resource states may occur by (1) an act of injecting the code itself (e.g., overwriting malware in memory) and (2) execution of the injected code (e.g., repairing damage done by malware). In one embodiment, execution of the suspicious process and malware on the endpoint may be terminated after monitoring of the malware behavior, while in another embodiment, an operating system image (binary) containing the suspicious process may not be changed. In either embodiment, the code is illustratively injected to provide dynamic, in-process vulnerability patching that enables remediation of the malware behavior at the endpoint.

Figure 6:
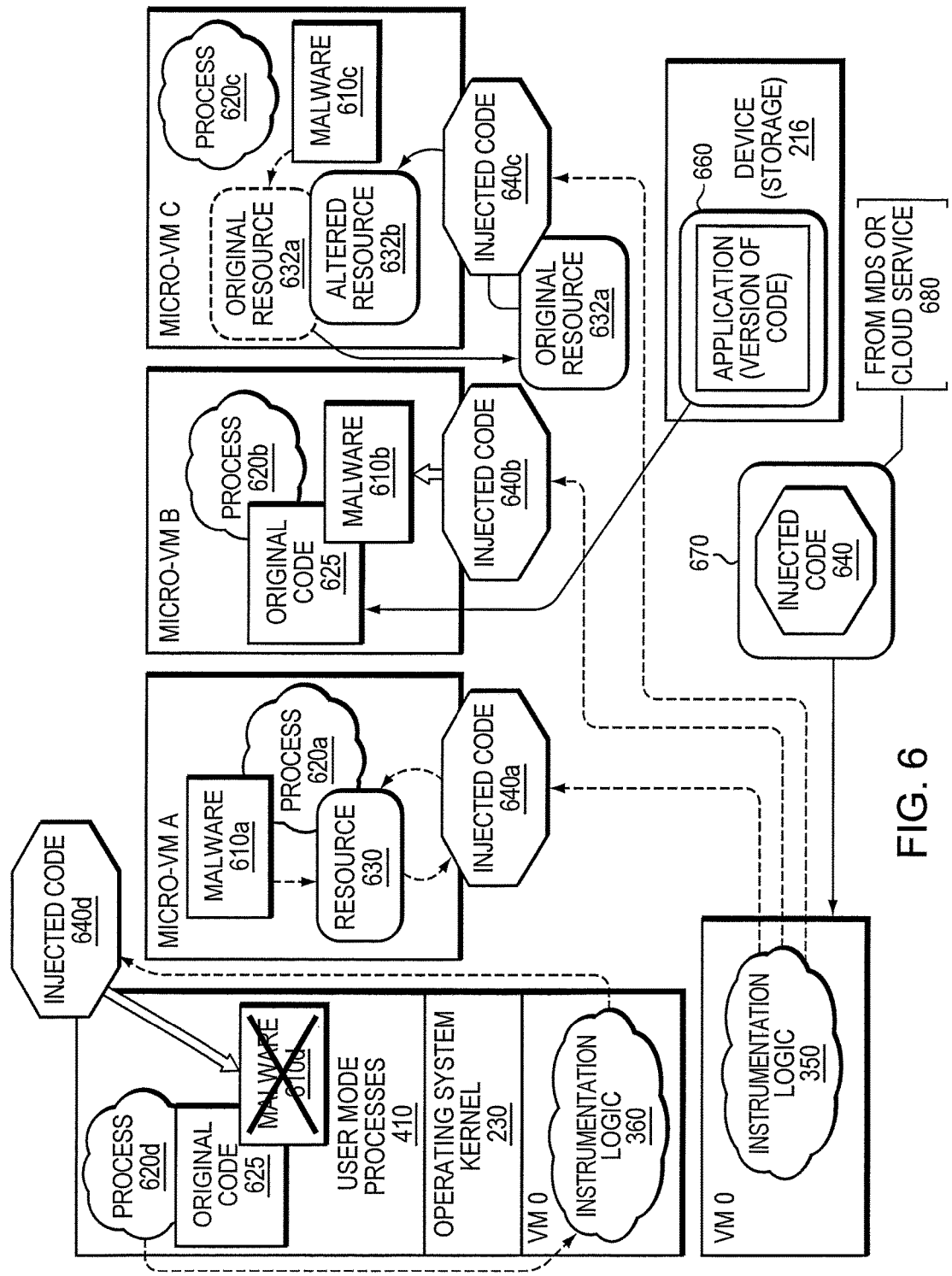
FIG. 6 is a block diagram of endpoint remediation using code injection that may be advantageously used with one or more embodiments described herein.

FIG. 6 is a block diagram of endpoint remediation using code injection that may be advantageously used with one or more embodiments described herein. Assume there has been an infection that manifests as changes to a kernel resource 630 (e.g., memory) by an exploit (i.e., vulnerability) to enable malware 610a to execute in process 620a in micro-VM A. Code may be injected (i.e., injected code 640a) to restore the memory (i.e., resource 630) to its state prior to the infection. Assume further that original code 625 of, e.g., process 620b stored at certain pages of memory is altered by malware 610b. During instrumentation of the process 620b in micro-VM B, the behavior of the malware 610b may be monitored as it attempts to change the original code stored in the memory pages. In response, the technique described herein may inject code 640b to reverse the changes made to the original code 625 by the malware 610b and to restore the state of that code. That is, the malicious changes to the memory pages may be overwritten (or alternatively removed and replaced) with the original code (i.e., the injected code 640b) to provide non-fixed (i.e., dynamic) patching of the process vulnerability. Thus, the process 620b altered by the malware need not be terminated; rather, the process 620b may be dynamically repaired at run-time. As such, the original code persistent on storage devices 216 need not be patched, despite the known exploit and/or malicious content (i.e., detected vulnerability) so as to, e.g., meet any requirements to run a specific version of the original code (e.g., embodied as application 525). Notably, restoration of the original code 625 may be accomplished by executing the injected code 640b at run-time to repair (rather than simply overwrite) the memory pages that store that original code.

In an embodiment, a file 660 containing the specific version of software (e.g., version of the application 525) may be executed at the endpoint; yet it may be undesirable (e.g., to meet a compliance requirement) to permanently change the file such that the software's instruction sequence or "logic" is altered. That is, the file may be an executable binary of an operating system that is deemed not subjectable to fixed (i.e., static) patching on the storage device 216. The executed binary (e.g., process 620b) may be instrumented at micro-VM B of the endpoint to uncover the malicious content and, further, to monitor its malicious behavior. According to the technique, the microvisor and VMM 0 do not stop ("kill") the malicious process 620b, but rather allow it to run in the micro-VM B while reversing any changes to the memory pages having the original code 625 or other kernel resource that the malware 610b may attempt. Essentially, the technique provides a dynamic patch while the process (malware) is running, e.g., in memory, without rendering any fixed or static changes to the executable file (binary) on the storage device. Notably, the patch may include code injected along-side the existing software instructions of the process (e.g., within an address space of the process) that is executed to repair damage by the malware. Illustratively, the dynamic patch may operate in a manner such that every time the malware attempts to alter (i.e., modify) the content of the kernel resource, such as a memory location, the microvisor and VMM 0 may remove (i.e., reverse) the modification and restore the state of that location, e.g., to its (prior) unaltered state. The microvisor and VMM 0 may direct operation of the dynamic patch either by directly restoring the altered kernel resource or executing the injected code (to effect restoration of the kernel resource), or combinations thereof.

In an embodiment, the technique may restore the malicious alterations (i.e., modifications) to an original resource state 632a by, e.g., capturing the state of the kernel resource execution context of the process (thread) before the process (thread) executes (i.e., original resource 632a) on the CPU and then reverting that context to the original captured state after being changed to an altered resource state 632b once execution of the thread begins. As a result, the microvisor and the VMM 0 may need to be aware of the occurrence of the malware in the process 620c so that the state of the kernel resource may be captured prior to the occurrence. Accordingly, once the malicious behavior of the malware is detected and the unaltered (i.e., original) state of the kernel resource 632a of the process is captured, dynamic (i.e., run-time) reversion to that unaltered state may be made by the microvisor and VMM 0 to thereby thwart the attempted malicious modification to the resource. Notably, the captured original state may require maintenance to enable reversion to that state after the occurrence.

Illustratively, knowledge of the exploit (and the malware) based on its malicious behavior may be known a priori (i.e., the exploit vulnerability and the resource altering behavior of the malware may be detected and recorded previously) so as to anticipate when the exploit occurs (and when the malware makes its illicit modifications). Notably, the a priori knowledge (i.e., identification of the malware and corresponding remediation) may be from another source, such as a cloud service 680 (i.e., an internet-based distribution service) or a database of the endpoint. That is, identification of the malware and the associated remediation (e.g., code injection to restore state of the affected process) may be obtained illustratively as a dynamic patch available from cloud service 680, the endpoint database, or a local server on the private network 130, wherein the patch may be available from an author (i.e., vendor) of the binary (i.e., application 525). As a result, the process need not be constantly instrumented (monitored) to uncover the occurrence. The technique (i.e., dynamic patching of the kernel resource) may be applied on subsequent executions of the binary file (i.e., invocations of the process 620b having the software instructions from the file 660) without instrumenting those subsequent executions. Accordingly, application of the dynamic patch need not have knowledge of the patch and specific kernel resources that may be remediated by applying that patch. The technique may merely inject the dynamic patch which performs appropriate remediation. In an embodiment, dynamic patches using injected code 640d to the instructions (original code 625) of the process 620d may be made as a preventative measure to avoid the exploit from occurring entirely, such that the malware 610d cannot execute. Illustratively, the dynamic patch may be in the form of a dynamic link library (DLL) injected into the process by 1) loading the DLL into the memory 220; 2) mapping one or more memory pages (e.g., code pages) having the dynamic patch into the address space of the process; and 3) executing the instructions of the dynamic patch to affect remediation.

In another embodiment, the original logic of the software instructions (i.e., flow of execution) of the process may be maintained, even though the malicious code (malware) remains in the process. That is, the malicious code (instructions) of the process may not be altered (e.g., overwritten); rather the original (i.e., non-malicious) flow of execution of the code (i.e., original process logic) may be maintained by dynamically altering the kernel resource so as to bypass execution of the malicious code. For example, assume the kernel resource is a process (call) stack and an exploit of the process executes (e.g., in a micro-VM) to cause a buffer overflow of the stack. Illustratively, the exploit may change a return address (for a function call) with an address of the malicious code (malware). As noted, the microvisor assumes control over the execution point of the process while it is running in the micro-VM. When the process is scheduled to execute on the CPU (by the scheduler), the microvisor and VMM 0 may divert execution to, e.g., the injected code without breaking the process logic. By injecting a correct return address on the stack, execution of the malware may be obviated by providing a dynamic patch that restores the stack to its correct state (i.e., the original non-malicious flow of execution) without breaking the logic (life cycle) of the process and without stopping or restarting the process (i.e., so as to allow the process to continue running).

In an embodiment, the restore state utilized by the microvisor and VMM 0 may be provided by the MDS appliance, which may have the a priori knowledge of the exploit vulnerability and the resource altering behavior of the malware. Although exploit and malware detection may be performed on a process at a micro-VM of the endpoint to render a determination that the process may contain an exploit/malware, the endpoint may report the determination to the MDS appliance for validation and/or more extensive analysis. As noted, the instrumentation of the micro-VM is light-weight in order to, inter alia, preserve (i.e., maintain) the user experience at the endpoint. Accordingly, the instrumentation performed by the micro-VM is limited such that there is no extensive CPU processing, i.e., efficient instrumentation that limits CPU processing to preserve the user experience. Instead, any extensive CPU processing is performed at the MDS appliance using, e.g., a run-time environment (software profile) of the endpoint. As a result of such extensive processing associated with the analysis, the MDS appliance may specify actions that VMM 0 and the microvisor should perform in order to address the occurrence of the detected exploit or malware at the endpoint. That is, the MDS appliance may detect the exploit and, based on the vulnerability, gather (i.e., record) the resource altering behavior of the malware. As such, the MDS appliance may illustratively instruct (e.g., via message 670 having injected code 640) the microvisor and VMM 0 as to when (e.g., relative to beginning execution of the process) and how to restore the state of the altered kernel resource with the original kernel resource (e.g., code content and/or a referenced address of the run-time environment) so as to avoid the exploit or repair damage from the malware according to the technique described herein.

While there have been shown and described illustrative embodiments for injecting code into a suspicious process containing malware executing on a node to enable remediation of that malware at the node, it is to be understood that various other adaptations and modifications may be made within the spirit and scope of the embodiments herein. For example, embodiments have been shown and described herein with relation the endpoint injecting code for remediation by the microvisor and VMM 0. However, the embodiments in their broader sense are not so limited, and may, in fact, provide a warning that may be displayed to an end user of the endpoint indicating detection of malware and/or remediation. The warning may instruct the end user to be aware (and be patient) while remediation is applied.

In addition, although the embodiments have been shown and described herein with relation to the microvisor and VMM 0 cooperating (at the endpoint) to inject code for remediation of malware, the embodiments may alternatively include a micro-kernel without protection domains (e.g., in lieu of the microvisor) operating at the highest CPU (hardware) privilege level and providing one or more interception points that pass control from the suspicious object executed in the VM N to the micro-kernel and/or hypervisor. In another alternative embodiment, the micro-kernel (without protection domains), VMM 0 and/or one or more hypervisors may be combined into a virtualization layer operating at the highest CPU privilege level that provide the one or more interception points. That is, the virtualization layer may underlie the operating system kernel (and/or guest operating system) such that the virtualization layer is configured to inject the code for remediation of malware at the endpoint.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving an object at an endpoint on a network, determining, by a virtual machine monitor, at least whether the object is suspicious as including possible malware configured to attempt a modification of one or more kernel resources;

instantiating, by the virtual machine monitor, a virtual machine as a container including an operating system process executing contents of the object, the operating system process to access one or more kernel resources;

monitoring one or more operations of the operating system process included in the virtual machine as the operating system process accesses the one or more kernel resources of the endpoint; and injecting code into a portion of memory associated with an address space of the operating system process during instrumentation of the virtual machine, the injected code being configured to remediate the modification of the one or more kernel resources accessed by the operating system process by restoring an original state of the one or more kernel resources without terminating the operating system process.

2. The method of claim 1 wherein the injected code executes in the portion of the memory associated with the address space of the operating system process to effect the remediation of the one or more kernel resources.

3. The method of claim 1 wherein the injecting of the code comprises:

overwriting the object in the portion of the memory, and wherein the one or more kernel resources include locations in the portions of the memory storing the object.

4. The method of claim 1 further comprising:

capturing the original state of the one or more kernel resources prior to the operating system process accessing the one or more kernel resources; and executing the injected code to restore the modification of the one or more kernel resources to the original state.

5. The method of claim 1 wherein a message having the injected code is received via the network at the endpoint, the message instructing the endpoint to restore the one or more kernel resources.

6. The method of claim 1 wherein the modification to the one or more kernel resources is prevented by the injected code, thereby thwarting the attempted modification of the one or more kernel resources by the object.

7. The method of claim 1 wherein the operating system process includes instructions for a version of an application having known malware in the object, the application stored in a file unpatched to prevent the modification of the one or more kernel resources.

8. The method of claim 1 wherein a virtual machine monitor injects the code into the operating system process in response to a capability violation of a protection domain associated with the operating system process.

9. The method of claim 1 wherein an original flow of execution of the operating system process is restored without altering the logic of the software instructions of the operating system process.

10. The method of claim 1 wherein the instantiating of the virtual machine as the container comprises creating an instance from another virtual machine that is substantially similar to the VM, but includes different instrumentation logic.

11. The method of claim 10 wherein the injecting of the code comprises:

overwriting the object in the portion of memory, and wherein the one or more kernel resources include locations in the portions of the memory storing the object.

12. The method of claim 1, wherein the determining that the operating system process is suspicious includes conducting a static analysis on the object, the static analysis includes one or more non-behavioral analyses of the object in order to detect, without execution of the object, anomalous characteristics associated with the object.

13. A method to remediate malware, included as part of an object, that is infecting an endpoint, the method comprising:

determining, by a virtual machine monitor, at least whether the object is suspicious as possibly including malware configured to attempt a modification of one or more kernel resources;

instantiating, by the virtual machine monitor, a virtual machine to process an operating system process configured to execute contents of an object that include possible malware, the operating system process having instructions for a version of an application vulnerable to the malware;

monitoring one or more operations of the operating system process included in the virtual machine as the operating system process accesses one or more kernel resources; and injecting code into a portion of memory associated with an address space of the operating system process during instrumentation of the virtual machine, the injected code being configured to remediate the modification of at least one of the one or more kernel resources accessed by the operating system process by at least restoring an original state of the at least one of the one or more kernel resources without terminating the operating system process.

14. The method of claim 13 wherein the injected code executes in the portion of the memory associated with the address space of the operating system process to effect the remediation of the at least one of the one or more kernel resources.

15. The method of claim 13 further comprising:

capturing the original state of the one or more kernel resources prior to the operating system process accessing the one or more kernel resources; and executing the injected code to restore the modification of the at least one of the one or more kernel resources to the original state.

16. The method of claim 13 wherein a message having the injected code is received via a network at the endpoint, the message instructing the endpoint to restore the modification of the at least one kernel resource of the one or more kernel resources.

17. The method of claim 13 wherein the modification to the at least one of the one or more kernel resources is prevented by the injected code, thereby thwarting the modification of the at least one of the one or more kernel resources by the object.

18. The method of claim 13 wherein the operating system process includes instructions for the version of the application vulnerable to the known malware, the application being stored in a file unpatched from preventing the attempted modification of the one or more kernel resources.

19. The method of claim 13 wherein the virtual machine monitor injects the code into the operating system process in response to a capability violation of a protection domain associated with the operating system process.

20. The method of claim 13 wherein an original flow of execution of the operating system process is restored without terminating the operating system process.

21. The method of claim 13, wherein the determining that the operating system process is suspicious includes conducting a static analysis on the object, the static analysis includes one or more non-behavioral analyses of the object in order to detect, without execution of the object, anomalous characteristics associated with the object.

22. A system comprising:
a network interface connected to a network;
a memory coupled to the network interface and configured to store an object, a module, a virtual machine monitor and a virtual machine; and
a central processing unit (CPU) coupled to the memory and adapted to execute the module, virtual machine monitor and virtual machine, wherein the module and virtual machine monitor are configured to:
determine, by the virtual machine monitor, at least whether the object is suspicious as including possible malware configured to attempt a modification of one or more kernel resources,
instantiate, by the virtual machine monitor, the virtual machine as a container to include an operating system process executing contents of the object, the operating system process to access one or more kernel resources,
monitor one or more operations of the operating system process included in the virtual machine as the operating system process accesses one or more kernel resources, and
inject code into a portion of the memory associated with an address space of the operating system process during instrumentation of the virtual machine, the injected code being configured to remediate the modification of the one or more kernel resources accessed by the operating system process by restoring an original state of the one or more kernel resources without terminating the operating system process.

23. The system of claim 22 wherein the injected code executes in the portion of the memory associated with the address space of the operating system process to effect the remediation of the one or more kernel resources.

24. The system of claim 22 wherein the injected code overwrites the object in the portion of the memory, and wherein the one or more kernel resources include locations in the portion of the memory storing the object.

25. The system of claim 22 wherein the module and the virtual machine monitor are further configured to:
capture the original state of the one or more kernel resources prior to the operating system process accessing the one or more kernel resources; and
execute the injected code to restore the modification of the one or more kernel resources to the original state.

26. The system of claim 22 wherein a message having the injected code is received via the network at the system from a cloud service, the message instructing the system to restore the one or more kernel resources.

27. The system of claim 22 wherein the modification to the one or more kernel resources is prevented by the injected code, thereby thwarting the modification of the one or more kernel resources by the object.

28. The system of claim 22 wherein the operating system process includes instructions for a version of an application having known malware in the object, the application stored in a file unpatched to prevent attempted modification of the one or more kernel resources by the malware.

29. The system of claim 22 wherein the virtual machine monitor injects the code into the operating system process in response to a capability violation of a protection domain associated with the operating system process.

30. The system of claim 22 wherein an original flow of execution of the operating system process is restored without altering the logic of the software instructions of the operating system process.

31. The system of claim 26 wherein the message includes instructions relative to a beginning of execution of the operating process to inject the code.

32. The system of claim 22, wherein the CPU determining that the operating system process is suspicious by at least conducting a static analysis on the object, the static analysis includes one or more non-behavioral analyses of the object in order to detect, without execution of the object, anomalous characteristics associated with the object.

* * * * *